(12) United States Patent
Zhang (10) Patent No.: US 11,521,491 B2
(45) Date of Patent: Dec. 6, 2022

(54) PRIORITY VEHICLE MANAGEMENT

(71) Applicant: Ford Global Technologies, LLC, Dearborn, MI (US)

(72) Inventor: Linjun Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 16/751,248

(22) Filed: Jan. 24, 2020

(65) Prior Publication Data

US 2021/0233397 A1 Jul. 29, 2021

(51) Int. Cl.
| | |
|---|---|
| *G08G 1/09* | (2006.01) |
| *G05D 1/00* | (2006.01) |
| *H04W 4/44* | (2018.01) |
| *H04W 4/46* | (2018.01) |
| *B60W 30/16* | (2020.01) |

(52) U.S. Cl.
CPC .............. *G08G 1/093* (2013.01); *B60W 30/16* (2013.01); *G05D 1/0027* (2013.01); *H04W 4/44* (2018.02); *H04W 4/46* (2018.02); *G05D 2201/0213* (2013.01)

(58) Field of Classification Search
CPC .......... G08G 1/093; H04W 4/46; H04W 4/44; B60W 30/16; G05D 1/0027; G05D 2201/0213
See application file for complete search history.

(56) References Cited

U.S. PATENT DOCUMENTS

| | | | | |
|---|---|---|---|---|
| 10,311,722 | B2 * | 6/2019 | Pretorius | ............ G06K 7/10366 |
| 11,277,721 | B2 * | 3/2022 | Moisio | .................. H04W 12/06 |
| 2009/0174572 | A1 * | 7/2009 | Smith | .................. G08G 1/0965 |
| | | | | 340/902 |
| 2010/0317420 | A1 * | 12/2010 | Hoffberg | ............ G06Q 30/0282 |
| | | | | 463/1 |
| 2013/0195272 | A1 * | 8/2013 | Nagai | ..................... G08G 1/163 |
| | | | | 380/259 |

(Continued)

FOREIGN PATENT DOCUMENTS

| | | |
|---|---|---|
| CN | 109462836 A | 3/2019 |
| KR | 101426294 B1 | 8/2014 |
| KR | 101803651 B1 | 12/2017 |

OTHER PUBLICATIONS

Mittal, P., et al., "Sybil Node Detection Using Neighbourhood Information Passing," IJCSMC, vol. 5, Issue. 8, Aug. 2016, p. 230-240.

*Primary Examiner* — Peter D Nolan
*Assistant Examiner* — Wae L Louie
(74) *Attorney, Agent, or Firm* — Frank A. MacKenzie; Bejin Bieneman PLC (57) ABSTRACT

A computer for a roadside infrastructure element includes a processor and a memory. The memory stores instructions executable by the processor to receive communications from a plurality of vehicles; receive sensor data about an area that includes the roadside infrastructure element; based on the sensor data, determine whether the plurality of vehicles includes a priority vehicle or a spoofing vehicle; and specify to the plurality of vehicles a first action upon determining that the plurality of vehicles includes the priority vehicle, and a second action upon determining that the plurality of vehicles includes a spoofing vehicle.

19 Claims, 8 Drawing Sheets

(56) References Cited

U.S. PATENT DOCUMENTS

| | | | |
|---|---|---|---|
| 2015/0052352 A1* | 2/2015 | Dolev | H04L 9/3278 |
| | | | 713/156 |
| 2016/0087804 A1* | 3/2016 | Park | H04L 9/3268 |
| | | | 713/156 |
| 2017/0032666 A1* | 2/2017 | Pretorius | G06K 7/10425 |
| 2017/0215045 A1* | 7/2017 | Rasal | G01S 19/215 |
| 2019/0041223 A1* | 2/2019 | Yang | G01C 21/30 |
| 2019/0068639 A1* | 2/2019 | Alexander | H04W 4/46 |
| 2019/0215695 A1* | 7/2019 | Yang | H04W 4/40 |
| 2020/0008027 A1* | 1/2020 | Yabuuchi | G08G 1/096725 |
| 2020/0051434 A1* | 2/2020 | Sasaki | G07C 5/008 |
| 2020/0053113 A1* | 2/2020 | Sasaki | G08G 1/0116 |
| 2021/0200207 A1* | 7/2021 | Soryal | H04L 63/0823 |
| 2021/0233397 A1* | 7/2021 | Zhang | G08G 1/093 |

* cited by examiner

PRIORITY VEHICLE MANAGEMENT

BACKGROUND

The Society of Automotive Engineers (SAE) has defined multiple levels of vehicle automation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances with human supervision but without direct human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

Vehicle-to-infrastructure (V2I) and vehicle-to-vehicle (V2V) communications can allow for vehicles at various levels of automation to provide each other and/or infrastructure elements with data. For example, the infrastructure element may be able to provide data about objects, hazards, etc., in the area to support a vehicle's path planning, e.g., avoidance of hazards and objects, and/or vehicles may be able to provide each other with such data.

DESCRIPTION

Overview

A system comprises a computer for a roadside infrastructure element, the computer including a processor and a memory. The memory storing instructions executable by the processor to receive communications from a plurality of vehicles; receive sensor data about an area that includes the roadside infrastructure element; based on the sensor data, determine whether the plurality of vehicles includes a priority vehicle or a spoofing vehicle; and specify to the plurality of vehicles a first action upon determining that the plurality of vehicles includes the priority vehicle, and a second action upon determining that the plurality of vehicles includes a spoofing vehicle.

The instructions can further include instructions to determine whether the plurality of vehicles includes the priority vehicle or the spoofing vehicle based in part on whether the computer has identified a priority message from one of the plurality of vehicles. The instructions can further include instructions to, upon determining that the priority message is identified, then determine whether the priority vehicle is included in the plurality of vehicles based on the sensor data. The instructions can further include instructions to, upon determining that the priority message is not identified, determine, based on identifying a specified traffic pattern from the sensor data, that the plurality of vehicles includes the spoofing vehicle. The specified traffic pattern can include at least one of two or more of the plurality of vehicles stopped for an amount of time within a specified range or two or more of the plurality of vehicles stopped at locations within a specified area within the area that includes the roadside infrastructure element. The specified traffic pattern can be determined for an area around the roadside infrastructure element based on data collected from monitoring traffic in the area around the roadside infrastructure element. The specified traffic pattern can be determined based on inputting data about traffic in the area around the roadside infrastructure element to a deep neural network. The spoofing vehicle can be configured to transmit a spoofing message at a power level determined to be undetectable by the roadside infrastructure element.

The first action can include yielding to the priority vehicle. The second action can include ignoring the spoofing vehicle.

The instructions can further include instructions to identify the spoofing vehicle in the sensor data. The instructions can further include instructions to determine respective locations of the spoofing vehicle at each of a plurality of times. The instructions can further include instructions to transmit a message via a wide area network to a remote computer identifying the spoofing vehicle. The instructions can further include instructions to broadcast a message via a short-range communications protocol to the plurality of vehicles identifying the spoofing vehicle.

The system can further comprise a sensor arranged to provide the sensor data to the computer.

The system can further comprise one of the plurality of vehicles including a vehicle computer including a vehicle computer processor and a vehicle computer memory, the vehicle computer memory storing vehicle instructions executable by the vehicle processor to, upon receiving the first action or the second action, determine whether to execute the received first action or second action based on a direction of travel of the spoofing vehicle provided by the computer for the roadside infrastructure element. The vehicle instructions can further include instructions to determine whether to execute the received first action or second action based on a location of the spoofing vehicle provided by the computer for the roadside infrastructure element. The vehicle instructions to determine whether to execute the received first action or second action can further include instructions to determine whether the location of the spoofing vehicle provided by the computer for the roadside infrastructure element matches a location of one of the plurality of vehicle detected from vehicle sensor data. The vehicle instructions to determine whether the location of the spoofing vehicle provided by the computer for the roadside infrastructure element matches a location of one of the plurality of vehicle detected from vehicle sensor data can include instructions to account for a latency in communication of the location of the spoofing vehicle provided by the computer for the roadside infrastructure element.

The instructions can further include instructions to determine that the plurality of vehicles includes each of the priority vehicle and the spoofing vehicle.

With reference to FIGS. 1-4, a traffic communications and control system 100 includes an infrastructure element 140 with sensors 145, a communications module 150, and a computer 155, provided to monitor a defined area 200 around the infrastructure element 140, including vehicles 105, 205 in the area 200. For example, the defined area 200 could be an area that is proximate to the infrastructure element 140, i.e., is defined by a field of view of one or more element 140 sensors 145, or alternatively as an area defined by a radius around the element 140 or some other distance or set of distances relative to the infrastructure element 140.

Figure 3:
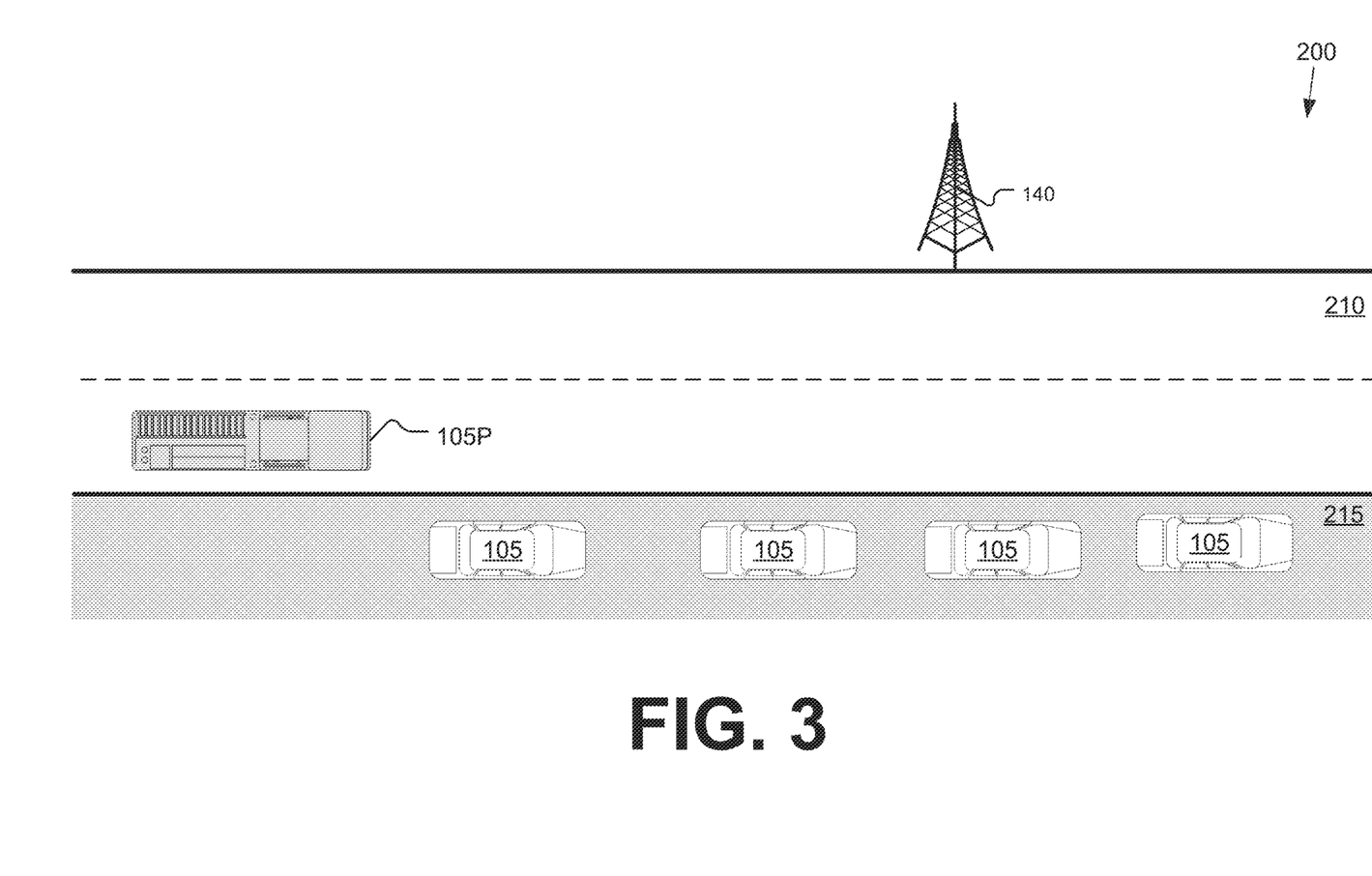
FIG. 3 is diagram illustrating a further example traffic scene in which the system of FIG. 1 could be implemented.
Figure 4:
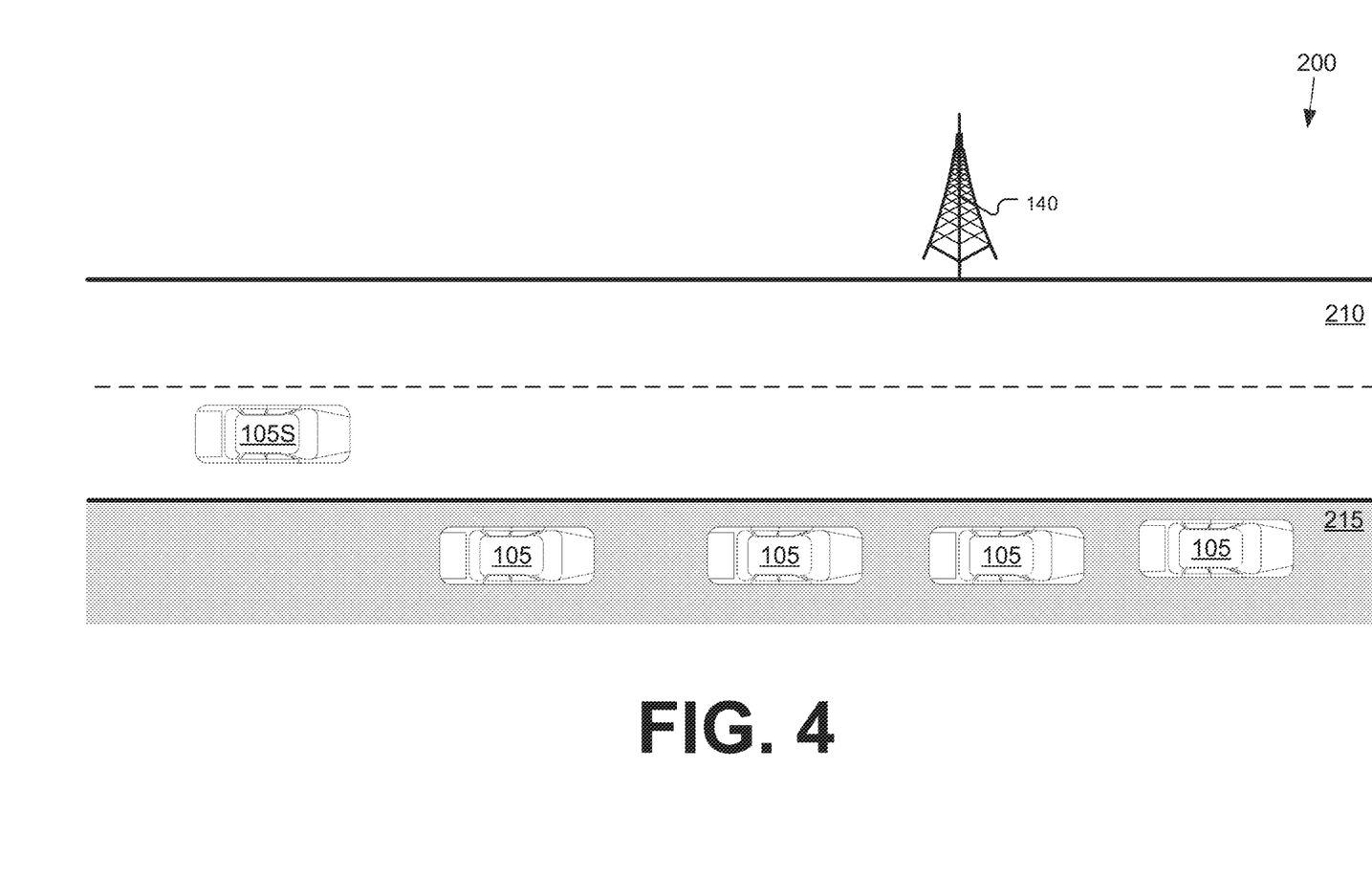
FIG. 4 is a diagram illustrating a further example traffic scene in which the system of FIG. 1 could be implemented.

Certain vehicles 105 included in a plurality of vehicles 105 that may be in an area 200 could be a priority vehicle 105P (see FIG. 3) or a spoofing vehicle 105S (see FIG. 4). A priority vehicle 105P is typically a government or emergency vehicle 105 that has priority over other vehicles 105 such that other vehicles 105 are obligated or required to yield, e.g., move to a side of a road 210, so that the priority vehicle 105 can pass. A priority vehicle 105 may be identified by data in a message sent to other vehicles 105 and/or an infrastructure 140, e.g., according to a vehicle 105 priority identifier, e.g., an alphanumeric string, recognized as indicating a priority vehicle 105. A spoofing vehicle 105S is a vehicle that includes a priority identifier in a message sent to other vehicles 105 and/or an infrastructure 140 but in fact is not a vehicle 105 to which other vehicles 105 are required to, or should, yield.

Figure 1:
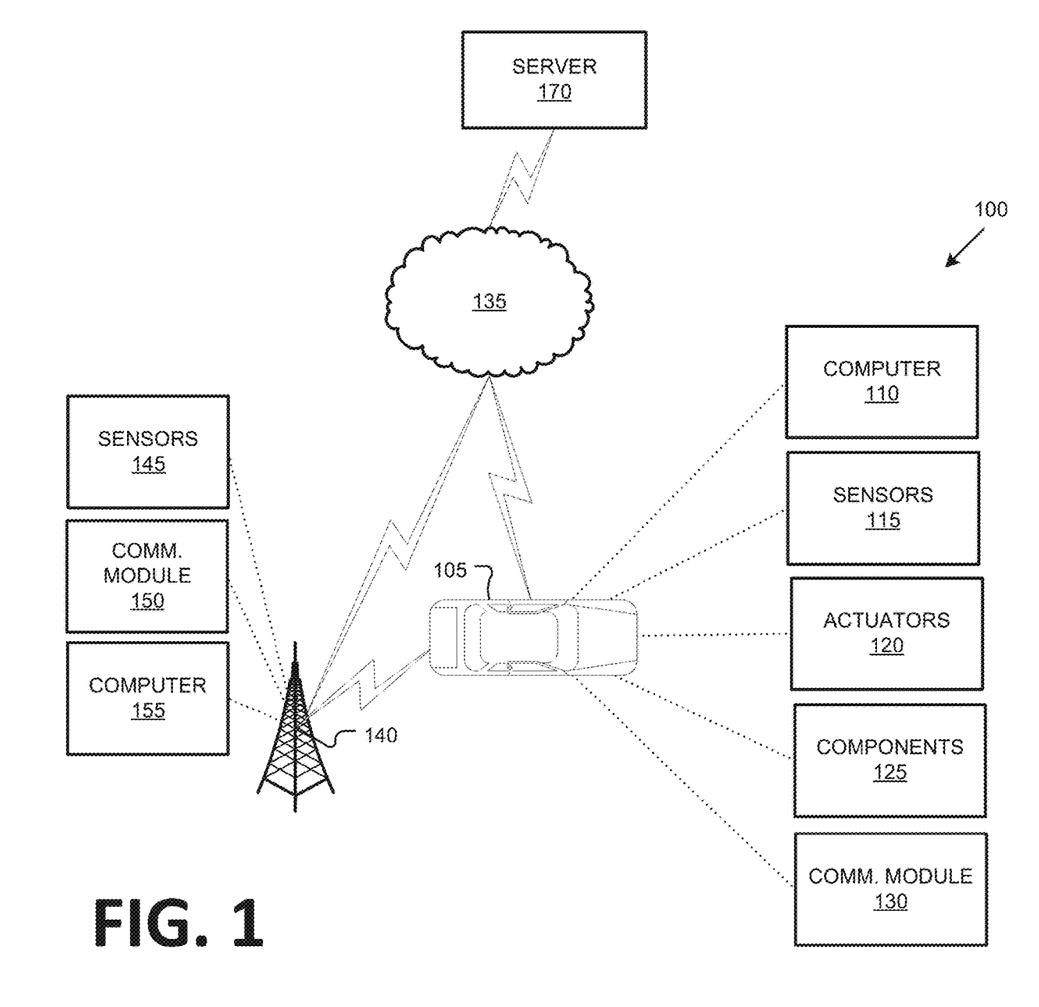
FIG. 1 is a block diagram illustrating an example traffic communications and control system.

The infrastructure element 140 computer 155 can be programmed to receive communications from a plurality of vehicles 105, 105P, 105S; receive sensor 145 data about an area 200 that includes the roadside infrastructure element140; based on the sensor 145 data, determine whether the plurality of vehicles 105, 105P, 105S includes a priority vehicle 105P or a spoofing vehicle 105S; specify to the plurality of vehicles 105, 105P, 105S a first action upon determining that the plurality of vehicles 105, 105P, 105S includes the priority vehicle 105P, and a second action upon determining that the plurality of vehicles includes a spoofing vehicle 105S.

Exemplary System

Vehicle

A vehicle 105 is described in the following paragraphs; understand that the description of the vehicle 105 typically also applies to vehicles 105P, 105S. The vehicle 105 is typically is a land vehicle such as a car, truck, a motorcycle, etc. A vehicle 105 can include a vehicle computer 110, sensors 115, actuators 120 to actuate various vehicle components 125, and a vehicle communications module 130. The communications module 130 allows the vehicle computer 110 to communicate with one or more infrastructure elements 140 and a central server 170, e.g., via a messaging or broadcast protocol such as Dedicated Short Range Communications (DSRC), cellular, and/or other protocols that can support vehicle-to-vehicle, vehicle-to infrastructure, vehicle-to-cloud communications, or the like, and/or via a packet network 135.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2I) wireless communications (cellular and/or DSRC, etc.) to another vehicle, to an infrastructure element 140 (typically via direct radio frequency communications) and/or (typically via the network 135) a remote server 170. The module 130 could include one or more mechanisms, i.e., conventional radio frequency transmitter and receiver components, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 can include cellular, Bluetooth, IEEE 802.11, dedicated short range communications (DSRC), cellular V2X (CV2X), and the like. For convenience, the label "V2X" is used herein for communications that may be vehicle-to-vehicle (V2V) and/or vehicle-to-infrastructure (V2I), and that may be provided by communication modules 130, 150 according to any suitable short-range communications mechanism, e.g., DSRC, cellular, or the like.

Network

The vehicle 105 and infrastructure element 140 (e.g., communications modules 130, 150) can communicate with one another and/or other devices via one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, Dedicated Short Range Communications (DSRC), Cellular Vehicle-to-Everything Communication (CV2x) etc.), local area networks (LAN) and/or wide area networks (WAN), including the Internet, providing data communication services.

Infrastructure Element

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. An infrastructure element 140 is typically stationary, i.e., fixed to and not able to move from a specific physical location. For convenience, "infrastructure" may be abbreviated to "IX." Although not shown for ease of illustration, the infrastructure element 140 also includes a power source such as a battery, solar power cells, and/or a connection to a power grid. One infrastructure element 140 is shown in FIG. 1 for ease of illustration, but the system 100 could include tens, hundreds, or thousands of elements 140.

The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view. Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 could include one or more mechanisms, i.e., conventional radio frequency transmitter and receiver components, by which the computers 155 of IX elements 140 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 150 can include cellular, Bluetooth, IEEE 802.11, dedicated short range communications (DSRC), cellular V2X (CV2X), and the like.

The computer 155 includes a processor and a memory such as are known. The memory includes one or more forms of computer-readable media, and stores instructions executable by the computer 110 such that the computer 155 is programmed to perform various operations such as described herein.

Traffic Areas

Figure 2:
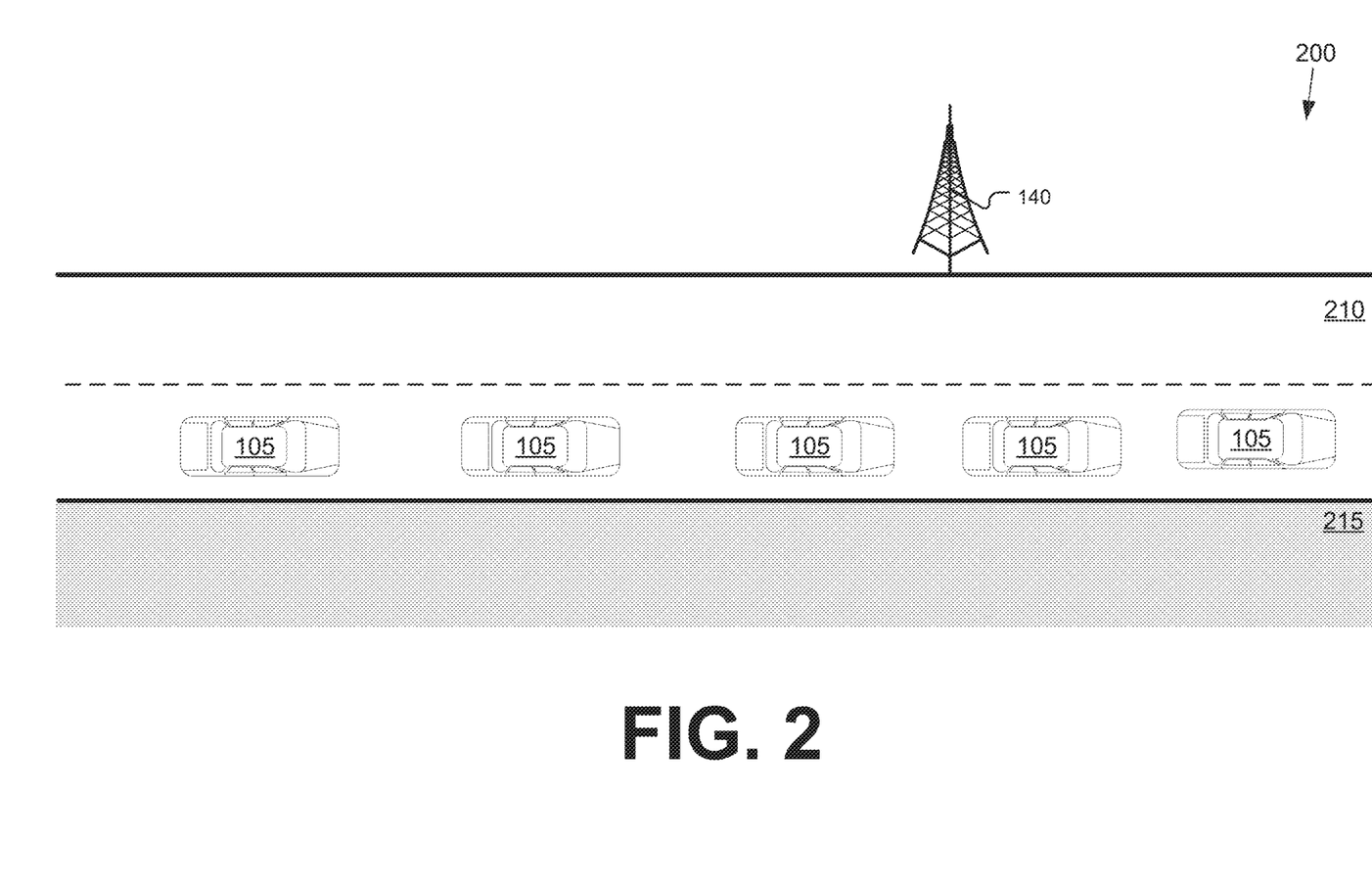
FIG. 2 is a diagram illustrating an example traffic scene in which the system of FIG. 1 could be implemented.

FIGS. 2-4 are various illustrations of an example traffic area 200 monitored by an infrastructure element 140. The traffic area 200 includes vehicles 105 on a road 210; as illustrated in FIGS. 3 and 4, the vehicles 105 in a traffic area 200 could include priority and/or spoofing vehicles 105P, 105S. As noted above, the defined area 200 could be defined by a field of view of one or more element 140 sensors 145, or by a radius around the element 140 or some other distance or set of distances relative to the infrastructure element 140.

Vehicles 105, via communication modules 130 as described above, may send and receive V2X communications. For example, a priority vehicle 105P may transmit a priority message via DSRC or the like. A "message" in the context of this disclosure is a set of digitally encoded data transmitted, e.g., via radio frequency communications, from a first device to a second device, e.g., the first and second devices could be the modules 130, 150 transmitting and receiving data for computers 110, 155. The message typically includes one or more conventional data packets, i.e., packets that include a header and a payload, the payload providing various data, i.e., message content. As is known, computers 110, 155 can be programmed to encode and serialize, i.e., convert to a string of bits, data, such as data describing objects, data describing vehicle 105 operating conditions such as speed, heading, etc., data about a vehicle's planned route, etc., so that the data can be included in a message comprising packets that include the serialized data (or, in each of a plurality of packets, a portion thereof) as a payload, the message being transmitted to or from vehicle(s) 105 and/or infrastructure(s) 140, i.e., devices that are senders and/or receivers. The system can, and typically does, include a plurality of senders and/or a plurality of receivers, i.e., at least one IX element 140 and a plurality of vehicles 105 and hence a plurality of communication modules 130, 150.

A V2X message can include a priority indicator in a message payload. For example, the priority indicator could be a binary value (zero or one, yes or no, etc.) specifying that a vehicle 105 is or is not a priority vehicle 105P. Alternatively or additionally, a null value could be a default value specifying that a vehicle 105 is not a priority vehicle 105P. Yet further, the priority indicator could be a field having more than one bit to specify that a vehicle 105 is not a priority vehicle 105P, or is a specific type of priority vehicle 105P, e.g., different values could specify an ambulance, police car, fire truck, and/or other type of priority vehicle 105P. A computer 110, 155 can receive a V2X message including a priority indicator, and can determine a value of the priority indicator up on decoding a message payload. Accordingly, the computer 155 can include instructions executable by its memory, i.e., can be programmed, to determine whether a plurality of vehicles 105 includes a priority vehicle 105P or the spoofing vehicle 105S based in part on whether the computer 155 has identified a priority message from one of the plurality of vehicles.

Further, a computer 155 can be programmed to, upon determining that a priority message is identified, i.e., when a received V2X message from a vehicle 105 indicates a priority vehicle 105P, then determine whether the priority vehicle 105P is included in the plurality of vehicles based on the sensor data. For example, VIX element 140 could include imaging sensors 145 such as cameras. Conventional image recognition techniques could be used to determine whether an image captured by a sensor 145 includes a representation of a priority vehicle 105P, e.g., whether a police vehicle or other priority vehicle 105P can be identified in the image.

The computer 155 can be further programmed to, upon determining that a priority message is not identified, determine, based on identifying a specified traffic pattern from the sensor data, that the plurality of vehicles includes the spoofing vehicle. A "traffic pattern" herein means a set of locations of respective vehicles 105 at a specified time, or over a specified range of time.

A memory or data store of the computer 155 can store one or more traffic patterns, along with an indication, for each traffic pattern, that the traffic pattern indicates vehicle 105 behavior associated with a priority vehicle 105P being present or not being present. Note, however, that a traffic pattern associated with a priority vehicle 105P being present does not necessarily mean that a priority vehicle 105P is in fact present. For example, a spoofing vehicle 105S could be sending V2X messages with a priority indicator, thereby spoofing the presence of an actual priority vehicle 105P.

For example, FIG. 3 illustrates a traffic pattern where a priority vehicle 105P is present, and FIG. 4 illustrates a similar traffic pattern where a priority vehicle 105P is not present but a spoofing vehicle 105S is present. As illustrated, the computer 155 could determine that a traffic pattern includes at least one of two or more of a plurality of vehicles 105 in an area 200 stopped for an amount of time within a specified range. Alternatively or additionally, a traffic pattern could include two or more of the plurality of vehicle 105 in an area 200 stopped at specified locations, e.g., locations on a road 210 shoulder 215, within the area 200. Yet further, the traffic pattern could include two or more of the plurality of vehicles 105 in the area 200 stopping on a road 210 shoulder 215 for a specified amount of time, e.g., 10-20 seconds could be determined to be a time on a road 210 shoulder 215 typically resulting from a priority vehicle 105P, and then exiting the shoulder 215 and resuming travel on the road 210. Such traffic pattern, e.g., determined by observing actual traffic behavior on a road 210, could then be used to determine a presence of a priority vehicle 105P or, as described further below, a presence of a spoofing vehicle 105S because it has been otherwise determined that a priority vehicle 105P is not present. Thus, based on the traffic pattern of the vehicles 105, the computer 155 could determine that a priority vehicle 105P or spoofing vehicle 105S is present in an area 200 even if not detected by IX 140 sensors 145.

A traffic pattern can be determined for an area 200 around the roadside infrastructure element 140 based on data collected from monitoring traffic, i.e., vehicles 105, in the area 200. For example, IX sensors 145 could provide images, e.g., camera images, lidar images, etc., from which vehicle 105 locations could be determined at a specified time or times. Based on determining respective vehicle 105 locations, the computer 155 could determine whether a specified traffic pattern is identified, e.g., based on vehicles 105 being on a road 210 shoulder 215 for a specified time, etc.

In some examples, a traffic pattern is determined according to a yield ratio, i.e., a ratio of vehicles 105 at a set of specified locations, e.g., on a road 210 shoulder 215, that are locations vehicles 105 are expected to occupy when yielding to a priority vehicle 105P. The yield ratio is a simple percentage determined by dividing a number of vehicles appearing to yield (i.e., at yielding locations, e.g., on a shoulder 215) by a total number of vehicles along a specified distance of a road 210, i.e., from a start location to an end location.

Figure 8:
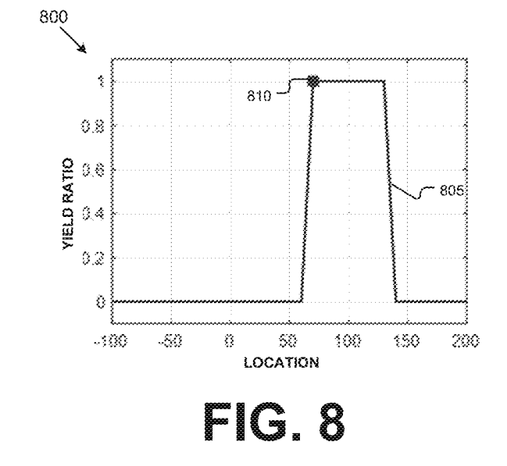
FIG. 8 illustrates an example graph 800 of a traffic pattern.

FIG. 8 is an example graph 800 of a traffic pattern that indicates a presence of a spoofing vehicle 105S. In this example, the x-axis for the graph 800 (labeled "location") provides a distance in meters from an infrastructure element 140, negative values being in a first direction, and positive values being in a second, 180 degree opposite direction. The y-axis for the graph 800 (labeled "yield ratio") provides a ratio of vehicles yielding, i.e., stopped on a road 210 shoulder 215, at the distances specified by the x-axis at a specific time t at which sensor 145 data was obtained. Thus, the line 805 is a plot of the yield ratio, i.e., determined by a number of vehicles 105 yielding, at the indicated distances at the time t. The point 810 specifies a location of a spoofing vehicle 105S at the time t. In this example, a traffic pattern indicating the spoofing vehicle 105S is a 100 percent yield ratio over a distance beginning with a non-yielding vehicle 105 and ending 80 meters ahead of the non-yielding vehicle 105 in a direction of travel along a lane of a road 210. The distance for a yield ratio could be empirically determined, e.g., based on a typical time-to-arrival of a priority vehicle 105P at a host vehicle 105 (based on vehicle 105P speed and/or distance relative to the host vehicle 105) on a specified road 210 and/or characteristics of the road 210, e.g., curvature or lack thereof. The non-yielding vehicle is then determined to be a spoofing vehicle 105S according to the traffic pattern.

Figure 5:
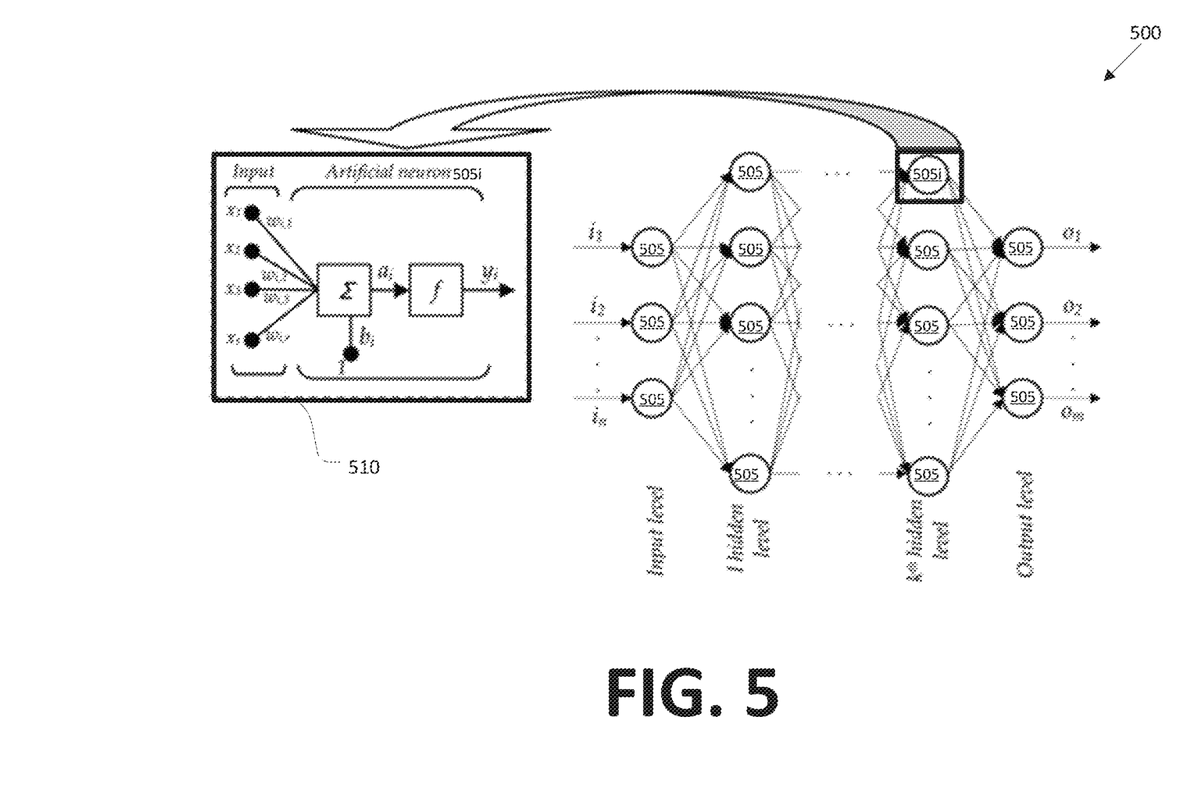
FIG. 5 is a diagram of an example deep neural network.

Further, a traffic pattern could be determined based on inputting data about vehicle 105 traffic in an area 500 around a roadside infrastructure element 140 to a deep neural network. FIG. 5 is a diagram of an example deep neural network (DNN) 500 that could be trained to identify a traffic pattern. The DNN 500 can be a software program that can be loaded in memory and executed by a processor included in a computer 155, for example. The DNN 500 can include n input nodes 505, each accepting a set of inputs i (i.e., each set of inputs i can include on or more inputs x). The DNN 500 can include m output nodes (where m and n may be, but typically are not, a same number) provide sets of outputs $o_1 \ldots o_m$. The DNN 500 includes a plurality of layers, including a number k of hidden layers, each layer including one or more nodes 505. The nodes 505 are sometimes referred to as artificial neurons 505, because they are designed to emulate biological, e.g., human, neurons. The neuron block 510 illustrates inputs to and processing in an example artificial neuron 505$i$. A set of inputs $x_1 \ldots x_r$ to each neuron 505 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 505$i$ output $y_i$. The activation function $f$ can be a variety of suitable functions, typically selected based on empirical analysis. As illustrated by the arrows in FIG. 5, neuron 505 outputs can then be provided for inclusion in a set of inputs to one or more neurons 505 in a next layer.

The DNN 500 can be trained to accept as input data, e.g., data specifying vehicle 105 locations and a time or times of each vehicle 105 in a plurality of vehicles 105 being at a location and/or locations in a range of time. The DNN 500 could be further trained to output a determination that a traffic pattern indicates a priority vehicle 105P (or possibly a spoofing vehicle 105S) is or is not present based the input data.

That is, the DNN 500 can be trained with ground truth data, i.e., data about a real-world condition or state. For example, in the present context ground truth data specifying a vehicle 105 location and a time or times is comprised of a feature matrix and a label. The feature matrix is raw data from a sensor 110, (e.g., RGB matrix for a camera sensor 110, point cloud data for a lidar sensor 110, etc.). The feature matrix could also include the processed data provided by the neural network specifying vehicle 105 location(s) and speed. The labels can be binary scalar values (e.g., 0 or 1) indicating whether the vehicles 105 are yielding or not. Weights w can be initialized by using a Gaussian distribution, for example, and a bias b for each node 505 can be set to zero. Training the DNN 500 can including updating weights and biases via conventional techniques such as back-propagation with optimizations. Example initial and final (i.e., after training) parameters (parameters in this context being weights w and bias b) for a node 505 in one example were as follows:

| Parameters | Initial value | Final value |
|---|---|---|
| $w_1$ | 0.902 | −0149438 |
| $w_2$ | −0.446 | −0.0103792 |
| $w_3$ | 1.152 | 0.00850074 |
| $w_r$ | 0.649 | 0.00349599 |
| $b_i$ | 0 | 0.00241366 |

A set of weights w for a node 505 together are a weight vector for the node 505. Weight vectors for respective nodes 505 in a same layer of the DNN 500 can be combined to form a weight matrix for the layer. Bias values b for respective nodes 505 in a same layer of the DNN 500 can be combined to form a bias vector for the layer. The weight matrix for each layer and bias vector for each layer can then be used in the trained DNN 500.

In the present context, the ground truth data used to train the DNN 500 could include data about respective locations of vehicles 105 in an area 500 (or alternatively imposed on a map of an area 500 based on data about locations of vehicles 105 relative to a generic roadside infrastructure element 140) at respective times. The DNN 500 could be trained using such ground truth data to identify a traffic pattern as associated or not associated with a priority vehicle 105P (or possibly a spoofing vehicle 105S) being in an area 200.

Determining from a traffic pattern that a priority vehicle 105P or spoofing vehicle 105S is indicated to be present in an area 200 can be useful, because a vehicle infrastructure element 140 computer 155 may not be able to determine from a V2X message that a priority vehicle 105P or spoofing vehicle 105S is transmitting a message with a priority indicator. For example, a spoofing vehicle 105S communication module 130 could be configured to transmit a spoofing message at a power level specified to be low enough so as to be undetectable by the roadside infrastructure element 140 communication module 150, but detectable by communication modules 130 of other vehicles 105 in an area 200.

Regardless of whether a computer 155 receives a message with a priority indicator from a vehicle 105, or whether the computer 155 alternatively or additionally determines that a vehicle 105 in an area 200 is present broadcasting a priority indicator based on a traffic pattern, the computer 155 can be programmed to determine whether a vehicle 105 in an area 200 determined to be present and broadcasting a priority indicator is a priority vehicle 105P or a spoofing vehicle 105S. Upon making such determination, the computer 155 can specify and broadcast, in a V2X message to vehicles 105 in the area 200, a first action upon determining a priority vehicle 105P, and a second action upon determining a spoofing vehicle 105S. For example, the first action can include yielding to the priority vehicle, and the second action can include ignoring the spoofing vehicle.

The vehicles 105 receiving the broadcast identification of a priority vehicle 105P or spoofing vehicle 105S and/or a recommended action in a V2X message from the infrastructure element 140 can then implement the action. In addition to recommending the action and possibly providing identification of the spoofing vehicle 105S, the V2X message may also specify a direction of travel of the priority vehicle 105P or spoofing vehicle 105S. Vehicles 105 traveling in a same direction of travel as the spoofing vehicle could then implement the action, whereas vehicles 105 traveling in an opposite direction could ignore the action. The direction of travel of the vehicle 105P, 105S could be determined by the computer 155 based on sensor 145 data as described above (e.g., the computer 155 could track locations of the vehicle 105P, 105S over time as further mentioned below), and/or could be specified in a message from the vehicle 105P, 105S.

A vehicle 105 computer 110 could execute vehicle instructions, upon receiving the first action or the second action in a message from the infrastructure element 140, determine whether to execute the received first action or second action based on a direction of travel of the spoofing vehicle provided by the computer for the roadside infrastructure element. Further, the vehicle 105 computer 130 could include instructions to determine whether to execute a received first action or second action based on a location of a spoofing vehicle 105S provided by the computer 155 for the roadside infrastructure element 140. For example, if a direction of travel of the spoofing vehicle 105S or the priority vehicle 105P is the same as a vehicle 105 receiving a message from the infrastructure element 140 about the vehicle 105S, 105P, then a location of the vehicle 105S, 105P could also be taken into account. For example, if a vehicle 105S is behind a vehicle 105 along a direction of travel, then the vehicle 105S can ignore the priority message from the vehicle 105S. Likewise, if a location of a priority vehicle 105P provided in a message is ahead of the vehicle 105 in a direction of travel of the vehicle 105, then the vehicle 105 can ignore the priority message from the vehicle 105P. The converse of these scenarios is also true.

Yet further, a vehicle 105 computer 110 could include instructions to determine whether to execute the received first action or second action based on whether the location of a spoofing vehicle 105S provided by the computer 155 for the roadside infrastructure element 140 matches a location of one of the plurality of vehicles 105 detected from vehicle 105 sensor 115 data. If so, the vehicle 105 computer 110 could determine to take the action. If not, the vehicle 105 computer 110 could determine to ignore the action.

Vehicle 105 computer 110 programming to determine whether a location of a spoofing vehicle 105S provided by the computer 110 for the roadside infrastructure element 140 matches a location of one of the plurality of vehicles 105 detected from vehicle 105 sensor 115 data could include instructions to account for a latency in communication of the location of the spoofing vehicle 105S provided by the computer 155 for the roadside infrastructure element 140. The determination can be based on the following expression (1):

$$\|P(t')-Q(t)\| \le v(t)(t'-t)+d$$

In this expression, times t and t' are times recorded by synchronized clocks, e.g., in a vehicle 105 and infrastructure element 140 (typically these are synchronized by virtue of both using Global Positioning System clocks). P(t') is a location provided in a priority message (i.e., from a priority vehicle 105P or spoofing vehicle 105S), and Q(t) is a location of a spoofing vehicle 105S provided in a message from the infrastructure element 140 identifying a spoofing vehicle 105S (sometimes referred to as a spoofing message). v(t) specifies a velocity of the spoofing vehicle 105S identified in the spoofing message, and the distance d is an offset empirically determined based on testing sensors 115, 145 to account for measurement errors or imprecision. If the differences in the location provided in the priority message and the location of a spoofing vehicle provided in a spoofing message differ by less than the predicted distance of travel of a vehicle 105 (adjusted by the offset d), then the vehicle 105 computer receiving the spoofing message can confirm, having accounted for a latency in respective sensor 145, 115 measurements at times t, t', that a detected vehicle is in fact the spoofing vehicle 105S.

Further, upon determining that a priority vehicle 105P or a spoofing vehicle 105S is present in an area 200, the computer 155 could be programmed to identify the vehicle 105P, 105S. For example, as mentioned above, a priority vehicle 105P could be identified based on image recognition techniques. Further, a priority vehicle 105P could be identified based on a location of the vehicle 105P relative to other vehicles 105. For example, as shown in FIG. 3, a priority vehicle 105P could be traveling in a travel lane of a road 210, past other vehicles 105 stopped on a shoulder 215 of the road 210. Similarly, as shown in FIG. 4, a spoofing vehicle 105S could be traveling in a travel lane of a road 210, past other vehicles 105 stopped on a shoulder 215 of the road 210. In these examples, the vehicles 105P, 105S, as well as the other vehicles 105, could be identified by the computer 155 using object recognition and interpretation techniques to interpret sensor 145 data.

Further, the computer 155 could determine respective locations of a vehicle 105P, 105S over time, i.e., at each of a plurality of times. Thus, a spoofing vehicle 105S, for example, could be tracked, and a location or locations of the spoofing vehicle 105S could be reported to a remote server 170, e.g., via the network 135. The report could include identifying indicia, e.g., an image of the spoofing vehicle 105S, an identifier of the vehicle 105S, if received, in a V2X message received by the computer 155, an image of a vehicle 105S license plate, etc. Further, the computer 155 could cause the communication module 150 to broadcast a V2X message, via a short-range communications protocol such as discussed above, to vehicles 105 in an area 200 identifying the spoofing vehicle, e.g., providing identifying indicia such as just discussed.

Processes

Figure 6:
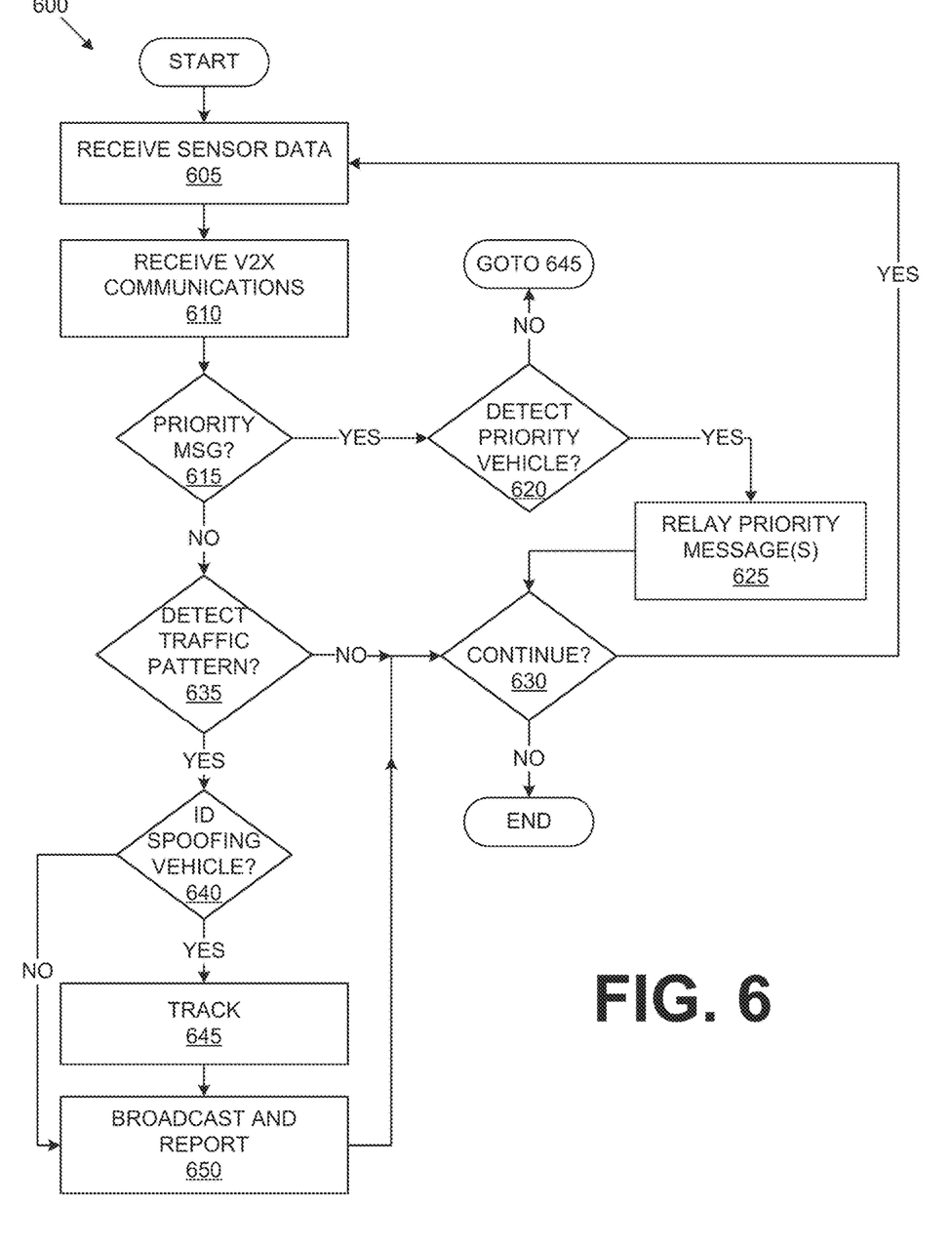
FIG. 6 is a flowchart of an example process for an infrastructure element computer to monitor an area for priority and/or spoofing vehicles.

FIG. 6 is a flowchart of an example process 600 for an infrastructure element computer 155 to monitor an area 200 for priority and/or spoofing vehicles 105P, 105S.

The process 600 begins in a block 605, in which the computer 155 receives sensor 145 data. As discussed above, sensor 145 data can provide measurements, e.g., images, about an area 200 in sensor 145 field or fields of view.

Next, or in practice substantially simultaneously with the block 605, in a block 610, the computer 155, typically via a communication module 150, receives one or more V2X communications, typically from one or more vehicles 105 in an area 200 proximate to the infrastructure element 140 hosting the computer 155.

Next, in a decision block 615, the computer 155 determines whether the message or messages received in the block 610 include a priority message, i.e., a message with a priority indicator as described above. If yes, in a block 620 is executed next. If no, then the process 600 proceeds to a block 635.

In the block 620, the computer 155 determines whether a priority vehicle 105P is detected from sensor data 145, as described above. If yes, then a block 625 is executed next. Otherwise, the process 600 proceeds to a block 645.

In the block 625, the computer 155 actuates the module 150 relay, i.e., broadcast or rebroadcast, the priority message or messages received in the block 610, and confirmed in the block 615.

In a block 630, which may follow the block 625 or a block 645, the computer 155 determines whether the process 600 is to continue. For example, the computer 155 could be programmed to execute the process 600 until manually deactivated, powered down, etc., or the computer 155 could be programmed to execute the process 600 at specified time intervals, at specified times of day, etc. If the process 600 is to continue, the process 600 returns to the block 605. Otherwise, the process 600 ends.

In the block 635, which follows the block 615 when the computer 155 determines that a priority message has not been received, the computer 155 determines whether a traffic pattern indicating a spoofing vehicle 105S is detected, as described above. If yes, the process 600 proceeds to a block 640. Otherwise, the process 600 proceeds to the block 630.

In the block 640, which is reached after the block 635 if no priority message was identified in the block 615, but a traffic pattern was determined to indicate a spoofing vehicle 105S in the block 635, then the computer 155 determines whether the spoofing vehicle 105S can be identified from sensor 145 data. For example, a spoofing vehicle 105S could be identified from data used to determine a traffic pattern, e.g., a spoofing vehicle 105S could be identified as a vehicle 105 in a lane of travel on a road 210 passing a plurality of vehicles shoulder 215 of the road 210. If the spoofing vehicle 106 can be identified, then the process 600 proceeds to the block 645. Otherwise, a block 650 is executed following the block 640.

Moreover, as an alternative to reaching the block 640 upon determining that no priority message was identified in the block 615, the block 640 could be executed upon a determination that a plurality of vehicles 105 in an area 200 includes each of a priority vehicle 105P and a spoofing vehicle 105S. That is, although explicitly not illustrated in FIG. 6, even if a priority message was determined in the block 615, the computer 155, even determining that a priority vehicle 105P is detected in the block 620, could then proceed to the block 640, or could execute the block 625 and then proceed to the block 640, to determine if a traffic pattern indicated a spoofing vehicle in addition to the identified priority vehicle 105P.

In the block 645, which may follow either the of the blocks 620, 640, the computer 155 tracks a location or locations of a spoofing vehicle 105S.

In the block 650, which may follow either of the blocks 640, 645, the computer 155 transmits data concerning the spoofing vehicle 105S. For example, the computer 155 could actuate the communication module 152 transmit a V2X message identifying the spoofing vehicle 105S, e.g., including an identifier in a spoofed priority message (if any), a location at a time t, a velocity, a direction of travel, possibly along with other data, including a recommended action, e.g., to ignore a spoofing vehicle 105S and maintain travel operation on a travel lane of a road 210. Further, the computer 155 could alternatively or additionally report the spoofing vehicle 105S to a remote server 170 via the network 135. Similar data as provided in a V2X message could be provided; the computer 155 could alternatively or additionally provide tracked locations, i.e. respective locations at each of a plurality of times, of the spoofing vehicle 105S. Moreover, the computer 155 could provide periodic reports to a remote server 170 via a separate process, e.g., information about spoofing vehicles 105S could be stored in a memory or data store the computer 155, which could then periodically, e.g., every hour, every day, etc., upload such data to the remote server 170. Following the block 650, the process 600 proceeds to the block 630.

Figure 7:
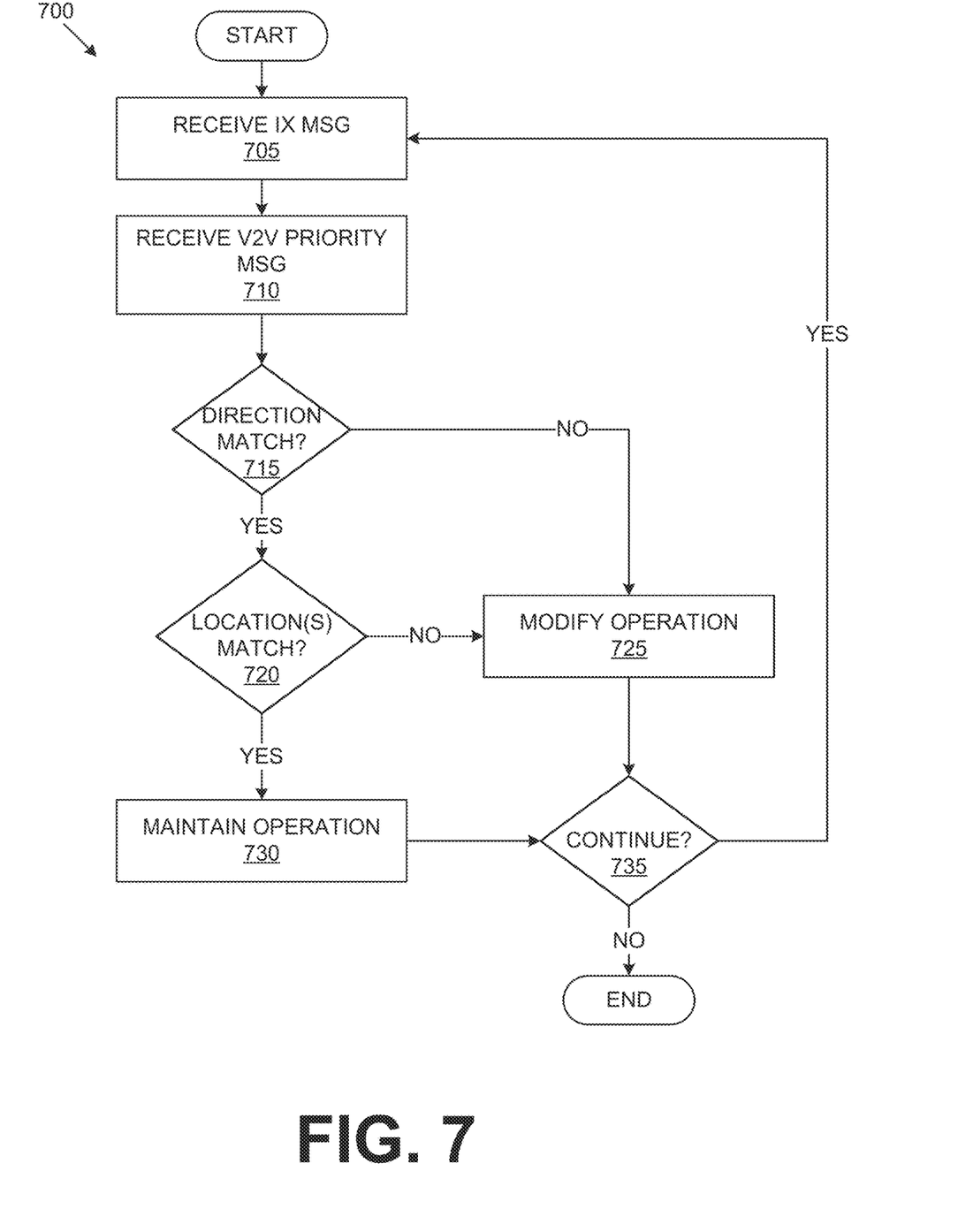
FIG. 7 is a flowchart of an example process for a vehicle computer to respond to a message from an infrastructure element about a priority and/or a spoofing vehicle.

FIG. 7 is a flowchart of an example process 700 for a vehicle 105 computer 110 to respond to a message from an infrastructure element about a spoofing vehicle 105S.

The process 700 begins in a block 705, in which the computer 110, e.g., via the communication module 130, receives a message from an infrastructure element 140 identifying spoofing vehicle 105S. Further, the message typically includes other information about the spoofing vehicle 105S, including a direction of travel, a location at a time t, and possibly also a speed.

Next, or in practice possibly substantially simultaneously with the block 705, in a block 710, the computer 110 receives a V2V priority message from another vehicle 105, i.e., a message identifying the other vehicle 105 as a priority vehicle 105P, and also including other data such as described above with respect to the block 705.

Next, in a decision block 715, the computer 110 determines whether a direction of travel of the vehicle 105S identified in the message received in the block 705 is a same direction of travel as the vehicle 105 sending the priority message received in the block 710. If yes, then the process 700 proceeds to a block 720. If no, then the process 700 proceeds to a block 725.

In the block 720, the computer 110 determines whether a location of the spoofing vehicle 105S reported in the message of the block 705 matches a detected location, e.g., based on vehicle 105 sensor 115 data, of the vehicle 105 sending the priority message received in the block 710. Alternatively, the computer 110 could determine whether a location, at a time t', of the spoofing vehicle 105S reported in the message of the block 705 matches a location, at a time t', of the vehicle 105 sending the priority message received in the block 710, as that location is reported in the priority message. In any event, in the present context, locations "match" if they are close enough so as to be in a margin that accounts for discrepancies or latencies in times when locations are reported and/or reasonable margins of error of sensor 115, 145 data. For example, expression (1) can be used to determine if locations match. If the locations do not match, then the process 700 proceeds to the block 725. Otherwise, the process 700 proceeds to a block 730.

In the block 725, which could follow either of the blocks 715, 720, the computer 110 actuates actuators 120 to control components 125 to modify vehicle 105 operation based on determining that a vehicle identified by the infrastructure element 140 as a spoofing vehicle 105S, as described with respect to the block 705, is not a same vehicle as a vehicle 105P identified in a priority message received as described with respect to the block 710. That is, typically, the computer 110 causes the vehicle 105 to move to a road 210 shoulder 215 and stop to allow the priority vehicle 105P to pass. Following the block 725, the process 700 proceeds to a block 735.

In the block 730, which could follow the block 720, the computer 110 actuates actuators 120 to control vehicle components 125 in a manner that maintains operations, e.g., travels a route or path, without regard to the priority message received in the block 710, i.e., that causes the vehicle 105 to ignore the spoofing vehicle 105S. Following the block 730, the process 700 proceeds to the block 735.

In the block 735, the computer 110 determines whether the process 700 is to continue. For example, the process 700 could execute substantially continuously while a vehicle 105 is powered on and/or in a "drive" mode, and could be ended when the vehicle 105 is powered off or put in a "parked" or "standby" mode. Alternatively or additionally, the process 700 could execute substantially continuously while the vehicle 105 is in a fully autonomous mode, and could be ended when the vehicle 105 is transitioned, e.g., by the computer 110 and/or user input, to a semi-autonomous or non-autonomous mode. If the process 700 is not to continue, then the process 700 ends following the block 735. Otherwise, the process 700 returns to the block 705 to monitor for a message from the infrastructure element 140 and/or other vehicles 105.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer for a roadside infrastructure element, the computer including a processor and a memory, the memory storing instructions executable by the processor to:
   receive communications from a plurality of vehicles;
   receive sensor data about an area that includes the roadside infrastructure element; based on the sensor data, determine whether the plurality of vehicles includes a priority vehicle to which other vehicles should yield, or a spoofing vehicle falsely indicating that other vehicles should yield to the spoofing vehicle; and
   specify to the plurality of vehicles a first action upon determining that the plurality of vehicles includes the priority vehicle, and a second action upon determining that the plurality of vehicles includes a spoofing vehicle, wherein the second action includes identifying the spoofing vehicle in the sensor data and determining respective locations of the spoofing vehicle at each of a plurality of times.

2. The system of claim 1, wherein the instructions further include instructions to determine whether the plurality of vehicles includes the priority vehicle or the spoofing vehicle based in part on whether the computer has identified a priority message from one of the plurality of vehicles indicating that the one of the vehicles is a priority vehicle to which others of the plurality of vehicles should yield.

3. The system of claim 2, wherein the instructions further include instructions to, upon determining that the priority message is identified, then determine whether the priority vehicle is included in the plurality of vehicles based on the sensor data.

4. The system of claim 2, wherein the instructions further include instructions to, upon determining that the priority message is not identified, determine, based on identifying a specified traffic pattern from the sensor data, that the plurality of vehicles includes the spoofing vehicle.

5. The system of claim 4, wherein the specified traffic pattern includes at least one of two or more of the plurality of vehicles stopped for an amount of time within a specified range or two or more of the plurality of vehicles stopped at locations within a specified area within the area that includes the roadside infrastructure element.

6. The system of claim 4, wherein the specified traffic pattern is determined for an area around the roadside infrastructure element based on data collected from monitoring traffic in the area around the roadside infrastructure element.

7. The system of claim 4, wherein the specified traffic pattern is determined based on inputting data about traffic in the area around the roadside infrastructure element to a deep neural network.

8. The system of claim 2, wherein the spoofing vehicle is configured to transmit a spoofing message at a power level determined to be undetectable by the roadside infrastructure element.

9. The system of claim 1, wherein the first action includes yielding to the priority vehicle.

10. The system of claim 1, wherein the instructions further include instructions to transmit a message via a wide area network to a remote computer identifying the spoofing vehicle.

11. The system of claim 1, wherein the instructions further include instructions to broadcast a message via a short-range communications protocol to the plurality of vehicles identifying the spoofing vehicle.

12. The system of claim 1, further comprising a sensor arranged to provide the sensor data to the computer.

13. The system of claim 1, further comprising one of the plurality of vehicles including a vehicle computer including a vehicle computer processor and a vehicle computer memory, the vehicle computer memory storing vehicle instructions executable by the vehicle processor to, upon receiving the first action or the second action, determine whether to execute the received first action or second action based on a direction of travel of the spoofing vehicle provided by the computer for the roadside infrastructure element.

14. The system of claim 13, the vehicle instructions further including instructions to determine whether to execute the received first action or second action based on a location of the spoofing vehicle provided by the computer for the roadside infrastructure element.

15. The system of claim 14, wherein the vehicle instructions to determine whether to execute the received first action or second action further include instructions to determine whether the location of the spoofing vehicle provided by the computer for the roadside infrastructure element matches a location of one of the plurality of vehicles detected from vehicle sensor data.

16. The system of claim 15, wherein the vehicle instructions to determine whether the location of the spoofing vehicle provided by the computer for the roadside infrastructure element matches a location of one of the plurality of vehicles detected from vehicle sensor data include instructions to account for a latency in communication of the location of the spoofing vehicle provided by the computer for the roadside infrastructure element.

17. The system of claim 1, wherein the instructions further include instructions to determine that the plurality of vehicles includes each of the priority vehicle and the spoofing vehicle.

18. A system, comprising a computer for a roadside infrastructure element, the computer including a processor and a memory, the memory storing instructions executable by the processor to:
   receive communications from a plurality of vehicles;
   receive sensor data about an area that includes the roadside infrastructure element; based on the sensor data, determine whether the plurality of vehicles includes a priority vehicle to which other vehicles should yield, or a spoofing vehicle falsely indicating that other vehicles should yield to the spoofing vehicle; and
   specify to the plurality of vehicles a first action upon determining that the plurality of vehicles includes the priority vehicle, and a second action upon determining that the plurality of vehicles includes a spoofing vehicle;
   wherein determining whether the plurality of vehicles includes the priority vehicle or the spoofing vehicle is based in part on whether the computer has identified a priority message from one of the plurality of vehicles indicating that the one of the vehicles is a priority vehicle to which others of the plurality of vehicles should yield;

upon determining that the priority message is identified, then determine whether the priority vehicle is included in the plurality of vehicles based on the sensor data, or, upon determining that the priority message is not identified, determine, based on identifying a specified traffic pattern from the sensor data, that the plurality of vehicles includes the spoofing vehicle.

19. The system of claim 18, wherein the second action includes identifying the spoofing vehicle in the sensor data and determining respective locations of the spoofing vehicle at each of a plurality of times.

\* \* \* \* \*